US010397230B2

(12) United States Patent
Callaghan et al.

(10) Patent No.: US 10,397,230 B2
(45) Date of Patent: Aug. 27, 2019

(54) SERVICE PROCESSOR AND SYSTEM WITH SECURE BOOTING AND MONITORING OF SERVICE PROCESSOR INTEGRITY

(71) Applicant: International Business Machines Corporation, Armonk, NY (US)

(72) Inventors: Patrick J. Callaghan, Vestal, NY (US); Kenneth A. Goldman, Norwalk, CT (US); Guerney D. H. Hunt, Yorktown Heights, NY (US); Elaine R. Palmer, Hanover, NH (US); Dimitrios Pendarakis, Westport, CT (US); David R. Safford, Clifton Park, NY (US); Brian D. Valentine, Endicott, NY (US); George C. Wilson, Austin, TX (US); Miriam Zohar, New Hempsted, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/623,750

(22) Filed: Jun. 15, 2017

(65) Prior Publication Data

US 2018/0365422 A1    Dec. 20, 2018

(51) Int. Cl.
*G06F 21/57* (2013.01)
*H04L 29/06* (2006.01)

(52) U.S. Cl.
CPC .......... *H04L 63/101* (2013.01); *G06F 21/575* (2013.01); *H04L 63/0435* (2013.01);
(Continued)

(58) Field of Classification Search
CPC . G06F 21/572; G06F 9/4406; H04L 63/0435; H04L 63/0442; H04L 63/0815; H04L 63/101; H04L 63/1408
See application file for complete search history.

(56) References Cited

U.S. PATENT DOCUMENTS 9,384,367 B2    7/2016  Swanson et al.
9,576,155 B2    2/2017  Potlapally et al.
(Continued)

FOREIGN PATENT DOCUMENTS

WO    WO2016/105969 A1    6/2016

OTHER PUBLICATIONS

List of IBM Patents or Patent Applications Treated as Related, Feb. 12, 2018, 2 pages.
(Continued)

*Primary Examiner* — Austin Hicks
(74) *Attorney, Agent, or Firm* — Stephen J. Walder, Jr.; Jeffrey S. LaBaw

(57) ABSTRACT

A service processor is provided that includes a processor, a memory coupled to the processor and having instructions for executing an operating system kernel having an integrity management subsystem, secure boot firmware, and a tamper-resistant secure trusted dedicated microprocessor. The secure boot firmware performs a secure boot operation to boot the operating system kernel of the service processor. The secure boot firmware records first measurements of code executed by the secure boot firmware when performing the boot operation, in one or more registers of the tamper-resistant secure trusted dedicated microprocessor. The operating system kernel enables the integrity management subsystem. The integrity management subsystem records second measurements of software executed by the operating system kernel, in the one or more registers of the tamper-resistant secure trusted dedicated microprocessor.

22 Claims, 5 Drawing Sheets

(52) U.S. Cl.
CPC ...... *H04L 63/0442* (2013.01); *H04L 63/0815* (2013.01); *H04L 63/1408* (2013.01)

(56) References Cited

U.S. PATENT DOCUMENTS

| | | | |
|---|---|---|---|
| 9,619,238 | B2 | 4/2017 | Potlapally et al. |
| 2005/0132202 | A1 | 6/2005 | Dillaway et al. |
| 2005/0138393 | A1 | 6/2005 | Challener et al. |
| 2007/0277038 | A1 | 11/2007 | Hardy et al. |
| 2011/0047618 | A1 | 2/2011 | Evans et al. |
| 2011/0173452 | A1 | 7/2011 | Nan et al. |
| 2011/0213953 | A1* | 9/2011 | Challener ............ G06F 21/57 713/2 |
| 2012/0084549 | A1 | 4/2012 | Mackintosh et al. |
| 2012/0233449 | A1* | 9/2012 | Thibadeau ......... G06F 21/575 713/2 |
| 2013/0174220 | A1 | 7/2013 | Berg et al. |
| 2014/0025939 | A1* | 1/2014 | Smith .................. G06F 9/24 713/2 |
| 2016/0328558 | A1 | 11/2016 | Renfro |
| 2018/0181759 | A1* | 6/2018 | Smith ................ G06F 21/575 |

OTHER PUBLICATIONS

"In-Depth Look at Capabilities: Samsung Knox and Android for Work", Samsung Electronics Co., Ltd., Samsung Electronics Co., Ltd., https://kpcdn.samsungknox.com/759d1af2cb26204a2f4852b151d9dc9c.pdf, 2015, 6 pages.

"Information technology—Trusted Platform Module Library—Part 1: Architecture,", ISO/IEC 11889-1:2015(E), Second Edition, Dec. 15, 2015, 278 pages.

"Main Page, SELinux Project Wiki, What is SELinux", SELinux Project, http://selinuxproject.org/page/Main_Page, May 12, 2013, last modified Nov. 30, 2017, 2 pages.

"Ostro™ OS System and Security Architecture", Intel Corporation, The Ostro™ Project, https://ostroproject.org/documentation/architecture/system-and-security-architecture.html, accessed Feb. 7, 2018, 10 pages.

"Trusted Platform Module (TPM) Summary", Trusted Computing Group, https://trustedcomputinggroup.org/trusted-platform-module-tpmsummary/, Apr. 1, 2008, 6 pages.

"White Paper: An Overview of Samsung KNOX™", Enterprise Mobility Solutions, Samsung Electronics Co., Ltd., http://www.samsung.com/global/business/business-images/resource/whitepaper/2013/06/Samsung_KNOX_whitepaper_June-0.pdf, Jun. 2013, 15 pages.

Brasser, Ferdinand et al., "Remote Attestation for Low-End Embedded Devices: the Prover's Perspective", Design Automation Conference (DAC), Jun. 5-9, 2016, 6 pages.

Dempsey, Kelley et al., "Information Security Continuous Monitoring (ISCM) for Federal Information Systems and Organizations", National Institute of Standards and Technology (NIST) Special Publication 800-137, Sep. 2011, 80 pages.

Greenberg, Andy, "Hackers Remotely Kill a Jeep on the Highway—With Me in It", WIRED, https://www.wired.com/2015/07/hackers-remotely-kill-jeep-highway/, Jul. 21, 2015, 21 pages.

Incibe, Red.ES, Huawei, "Building a Trusted and Managed IoT World", Mobile World Congress 2017, Barcelona, Spain, Feb. 28, 2017, 33 pages.

Regenscheid, Andrew, "BIOS Protection Guidelines for Servers", National Institute of Standards and Technology (NIST) Special Publication 800-147B, Aug. 2014, 32 pages.

Safford, David et al., "Design and Implementation of a Security Architecture for Critical Infrastructure Industrial Control Systems in the Era of Nation State Cyber Warfare", GE Global Research Center, Linux Security Summit, Aug. 25-26, 2016, 18 pages.

Sailer, Reiner et al., "Design and Implementation of a TCG-based Integrity Measurement Architecture", Proceedings of the 13th USENIX Security Symposium, Aug. 9-13, 2004, 17 pages.

Sedgewick, Adam et al., "Guide to Application Whitelisting", National Institute of Standards and Technology (NIST) Special Publication 800-167, Oct. 2015, 24 pages.

\* cited by examiner

SERVICE PROCESSOR AND SYSTEM WITH SECURE BOOTING AND MONITORING OF SERVICE PROCESSOR INTEGRITY

BACKGROUND

The present application relates generally to an improved data processing apparatus and method and more specifically to a service processor and system that implements secure booting of the service processor and monitoring of service processor integrity.

Many modern computing devices utilize service processors to provide remote monitoring and management of host systems. A service processor is a micro-controller associated with a host system (but not necessarily part of the host system) and may be used to configure the host system, monitor the health of the host system, provide and monitor firmware of the host system, log events, send alerts, and provide graceful shutdown, remediation, or recovery of the host system should a failure or error condition be detected. It should be appreciated that service processors are not Baseboard Management Controllers (BMCs) as BMCs are locally attached to host systems and monitor the physical condition of the host system, such as temperature, power, and storage.

Because the service processor has control over various aspects of the host system functionality, it is a prime target for attacks by malicious entities.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a service processor is provided that comprises a processor, a memory coupled to the processor and comprising instructions for executing an operating system kernel having an integrity management subsystem, secure boot firmware, and a tamper-resistant secure trusted dedicated microprocessor. The secure boot firmware performs a secure boot operation to boot the operating system kernel of the service processor. The secure boot firmware records first measurements of code executed by the secure boot firmware when performing the boot operation, in one or more registers of the tamper-resistant secure trusted dedicated microprocessor. The operating system kernel enables the integrity management subsystem. The integrity management subsystem records second measurements of software executed by the operating system kernel, in the one or more registers of the tamper-resistant secure trusted dedicated microprocessor.

In other illustrative embodiments, a data processing system is provided that comprises a service processor and a host computing system coupled to the service processor. The service processor performs a secure boot operation, by secure boot firmware of the service processor, to boot an operating system kernel of the service processor. The service processor records first measurements of code executed by the secure boot firmware when performing the boot operation, in one or more registers of a tamper-resistant secure trusted dedicated microprocessor of the service processor. The service processor enables an integrity management subsystem of the booted operating system kernel. The service processor records, by the enabled integrity management subsystem of the booted operating system kernel, second measurements of software executed by the operating system kernel, in the one or more registers of the tamper-resistant secure trusted dedicated microprocessor. Moreover, the service processor manages execution of code on the host computing system.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
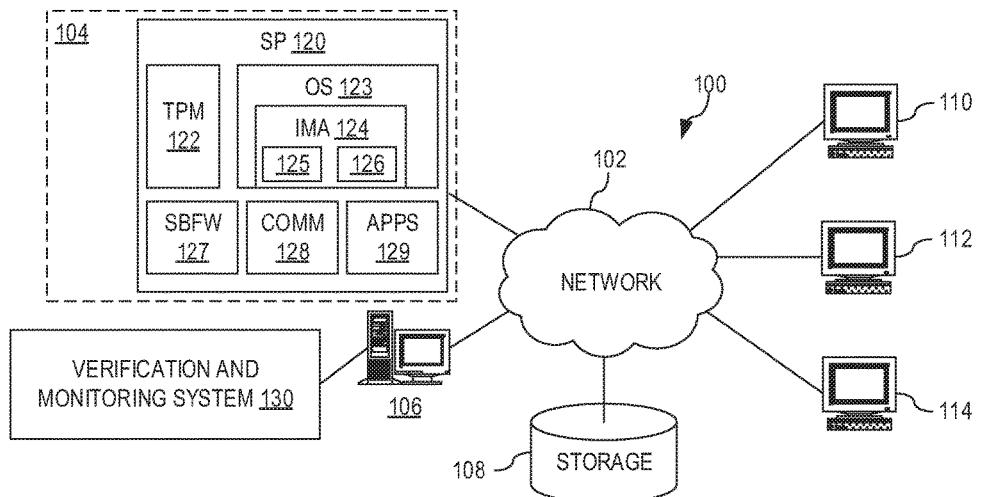
FIG. 1 is an example diagram of a distributed data processing system in which aspects of the illustrative embodiments may be implemented.

The illustrative embodiments provide mechanisms for securely booting a service processor, and monitoring service processor integrity. In many computer systems, it is of utmost importance to ensure that the configuration of the computer system, down to the last detail, remains unchanged until a highly-controlled, authorized update occurs. Examples include automated teller machines (ATMs), point of sale terminals, game consoles, engine control units, usage meters, and the like. Computer systems such as these are sometimes referred to as "appliances." To assist in ensuring immutability of computer systems such as these, tamper-protected hardware may be included.

Service processors may also be provided as appliances, and may contain such tamper-protected hardware. The National Institute of Standards and Technology (NIST) defines service processors (SPs) as "specialized microcontrollers that provide administrators with an interface to manage the host server," see A. Regenscheid, "BIOS Protection Guidelines for Servers, SP800-147B," August 2014, available at http://dx.doi.org/10.6028/NIST.SP.800-147B. Examples of host servers, in this context, may include enterprise systems controlled and used by one organization, cloud systems shared by multiple organizations, or the like, and may include mainframes or mainframe computers, server farms, blade servers, and the like. Managing a host server includes, but is not limited to, managing firmware, configuration data, storage, networks, memory, hypervisors, virtual machines, operating systems, containers, access control data, and cryptographic keys that are used in or run in the host servers.

Service processors are not limited to managing host servers. They can also provide management services to other systems, devices, or subsystems, e.g., service processors may be exclusive providers of firmware to subsystems of various systems or machines including, but not limited to, programmable components within a system, financial computing systems, government computing systems, automobiles, submarines, ships, aircraft, robots, and any other machines or systems that include one or more computing systems having one or more subsystems. The firmware running in such subsystems requires protection from accidents or erroneous operations, and even more importantly from malicious attacks that modify the firmware. To illustrate the need for such protections, consider the demonstrated, life-threatening remote attack over the internet on automobile firmware as described in A. Greenberg, "Hackers Remotely Kill a Jeep on the Highway—With Me in It," 21 Jul. 2015, which illustrates the motivation for protecting and continuously monitoring the integrity of components of systems supporting critical infrastructure or safety. Security of such systems is important in other systems as well, as illustrated by an architecture for the Internet of Things which recommends, "security management during the complete lifecycle, including device activation, identity authentication, secure storage, secure boot, integrity check, software upgrade, and device decommissioning," see INCIBE, Red.es, and Huawei, "Building a Trusted and Managed IoT World," February 2017.

The illustrative embodiments provide mechanisms for protecting service processors (SPs) from executing and using corrupted firmware, software, or data. The mechanisms may include a combination of firmware, software, security hardware, and a verification and monitoring system designed to protect such SPs. Such mechanisms are important to maintaining security of computing systems as it has been determined that it is critical to prevent the execution of malicious or corrupt code on the SPs due to the SPs having direct control over other operational aspects of the computing systems (host systems) with which they are associated. It should be noted that the configurations of SPs are strictly controlled and relatively static, even though the configurations of the host systems that they control can be quite dynamic.

SPs can serve as a foundation of trust for the systems they manage. The illustrative embodiments address the requirement to establish and maintain a known and trusted state of a SP originating from a known and trusted authority. The illustrative embodiments ensure that, with the mechanisms of the illustrative embodiments, e.g., a combination of hardware, firmware, software, and a monitoring system in some embodiments, modifications of any security relevant files of a SP are detected (and optionally prevented), not only at boot time, but continuing throughout the operation of that SP. The illustrative embodiments also address mandates to establish Information Security Continuous Monitoring (ISCM) of host systems, such as those operated by government organizations and other organizations.

With the mechanisms of the illustrative embodiments a system comprising a combination of hardware, firmware, and software is provided to prevent modification of security relevant immutable files on a SP, which are critical to the correct or safe operation of the SP. They include, but are not limited to, those files that are used during the process of booting the host system and those that are used during operation of the host system. Other examples of security relevant immutable files include, but are not limited to, operating system kernel images, application executables, class files, libraries, access control lists, password files, files that are used to update components (or subsystems) of the service processor or host system, and the like. With the addition of another computing system to perform remote verification and monitoring, the verification and monitoring system of the illustrative embodiments may issue alerts when the verification and monitoring system detects modifications of such security relevant immutable files on the SP. Additionally, the alerts may trigger an automated or manual update of the SP, so as to restore the SP to a configuration known to be secure.

The system of the illustrative embodiments incorporates several features that work together to protect the SP. In some illustrative embodiments, this is accomplished by incorporating the use of a computer hardware implemented secure trusted dedicated microprocessor, such as a Trusted Platform Module (TPM), secure boot firmware, trusted or measured boot software, and an operating system kernel, such as a Linux operating system kernel for example, with integrity management subsystem support available and enabled, such as the Integrity Management Architecture (IMA) subsystem, or the like. For purposes of the following description, example illustrative embodiments may be described that utilize a TPM with IMA subsystem support enabled, however this is not intended to be limiting on the scope of the present invention. To the contrary, other operating systems with other integrity management subsystems, and secure trusted dedicated microprocessors or microcontrollers may be used without departing from the spirit and scope of the illustrative embodiments.

In accordance with the mechanisms of one or more of the illustrative embodiments, the secure trusted dedicated microprocessors, assumed to be TPMs in these one or more illustrative embodiments, are tamper resistant microprocessors with a small amount of secure, persistent memory, cryptographic accelerators, and Platform Configuration Registers (PCRs). The TPMs are used to perform cryptographic operations and to protect the integrity of hash chains of measurements of software, configuration information, and data on a system. Additionally, the TPMs provide authentication (ensuring that the platform can prove that it is what it claims to be) and attestation (a process helping to prove that a platform is trustworthy and has not been breached), which are important operations to ensure security of computer systems and the SP in the present invention.

With the mechanisms of the example illustrative embodiments, a TPM, inside the SP, records measurements, e.g., hash values, of software, configuration information, and data, any of which may influence the security state of the SP. These measurements are protected inside the TPM in the form of a hash chain stored in PCRs. Software running on the service processor determines which measurements are recorded, as described further herein below. Those measurements are associated with event logs.

The TPM inside the SP also generates authentic attestation values that are verified by another computing system, referred to as a verification and monitoring system. The verification and monitoring system may have registered public key data and whitelist data that is used by the verification and monitoring system to verify the authenticity of the service processor and the measurement data submitted by the service processor for verification. This information may be registered with the verification and monitoring system by a manufacturer or provider of the service processor and/or service processor software, as described in further detail hereafter.

When the service processor is used to boot the host system, which may be local or remote to the service processor, a secure boot of the service processor and/or the host system will occur (The service processor and the host system may be booted independently or in tandem.) Secure boot firmware is commonly available on laptops, desktops, servers, tablets, smart phones, and other systems. One example of secure boot is implemented in the Unified Extensible Firmware Interface (UEFI), which may be implemented in one or more of the illustrative embodiments described herein. Other secure boot firmware/software may also be used without departing from the spirit and scope of the illustrative embodiments.

The secure boot firmware verifies that the first level boot loader was digitally signed by a private key corresponding to a public key configured in (or managed by) the secure boot firmware. Public keys used to verify digital signatures of firmware and software are not secret, but nevertheless, they must be protected from unauthorized modification. These public keys are often stored in hardware-protected persistent memory, such as flash, or they are embedded in or accompany the verifying firmware or software.

The first level boot loader ensures that any operating system (OS) kernel image subsequently booted was digitally signed by a private key corresponding to a trusted public key configured in the first level boot loader. Alternatively, the first level boot loader may load a second level boot loader instead of an OS kernel image. If so, the first level boot loader may verify the digital signature of the second level boot loader using a protected public key trusted by the first level boot loader. Subsequently, the second level boot loader may validate the OS kernel image that it loads. The first or second level boot loader may also load executable code, microcode, or configuration information, into other subsystems or components of the service processor, in which case, it will verify the digital signature of each object loaded. Note, although only a first level and second level boot loader are described, there is no limit to the number of boot loaders that may be called in sequence and thus, depending on the desired implementation, any number of boot loaders may be utilized without departing from the spirit and scope of the present invention.

In accordance with one or more illustrative embodiments, the TPM is used as a root of trust for measurement, as mentioned above. The SP records into the TPM a hash chain of measurements of the software the SP booted. The SP also maintains an accompanying log of the events that triggered the measurements, with the log entries having the same measurement data as is recorded in the registers of the TPM for that event, e.g., if the event is that an executable file is going to be executed, the log entry will include the register identifier identifying where the measurement data is stored, a hash of the executable file, and the full path and filename. More specifically, during the boot process, measurements of all software are recorded in registers, e.g., Platform Configuration Registers (PCRs), inside the TPM before the software is executed, where the term "measurements" as used herein refers to a hash value for the software which may include hashed data values such as time and date stamp, key, command lines, etc. Essentially the TPM internally hashes the information about the software prior to the software executing to generate a measurement which may be a hash value of the information fed to the TPM.

The term "measurement" is used to refer to the measuring of activity on the service processor and/or host system that indicates how the service processor and/or host system arrived at its current state. In most embodiments, the software state on the service processor and/or host system is measured, however in some illustrative embodiments, other information may be relevant to the current state of the service processor and/or host system, such as what device the boot software came from, what userid the system administer used, what files were executed as root, what time of day specific files were opened, etc. The particular elements of the service processor and/or host system that are measured is implementation dependent and are chosen so as not to overload the service processor and TPM with recording too many measurements, while still capturing the security-relevant measurements.

Measurements cannot be erased from the registers in the TPM except through a reboot of the service processor and host system. Thus, the TPM holds an accurate recording of the software booted on the service processor and host system, starting from the boot operation. Later, measurements recorded in the PCRs are sent securely to another computing system, e.g., the verification and monitoring system, as an authentic attestation of the current state of the service processor and host system.

After a successful secure boot of the OS kernel (with accompanying measurements and logging), the OS kernel runs with integrity management subsystem support enabled, e.g., IMA enabled. The IMA subsystem verifies that all system sensitive files opened by the OS kernel have a valid digital signature or match a predetermined hash value, and that the contents of the file have not changed since the signature or hash was affixed. This operation is referred to herein as integrity management system "appraisal", or IMA appraisal in some example embodiments. In accordance with the mechanisms of one or more of the illustrative embodiments, IMA appraisal is not limited to boot time or to the first time that a file is opened. In fact, IMA appraisal continues until the next boot cycle, and, in some illustrative embodiments, may cover tens of thousands of application files. For performance, in some illustrative embodiments, IMA only appraises a file the first time, and then again only when the file has changed. In addition, if the file has an applicable FILE CHECK policy rule, IMA will prevent signed files from being opened for write.

The organization or individual that has ownership over the physical service processor and/or host system can configure the integrity management subsystem, e.g., IMA subsystem, to run in one of two modes: enforcing or logging. In enforcing mode, if any verification fails, the SP will raise an alert and output or transmit a notification that the service processor and host system are compromised, and then terminate all services of the service processor. In logging mode, the SP will log the verification failure in an event log, but continues to execute and provide services to the host system.

In addition to verifying digital signatures and/or recording measurements of booted software, in one or more illustrative embodiments, the SP also verifies digital signatures and/or records measurements of executable files and security relevant files before they are executed or opened. Examples of security relevant files are device drivers, microcode to be applied to components of the service processor or host system, operating system updates, application software, application data, or the like. As is done at boot time, these measurements are recorded in registers, e.g., PCRs, in the TPM. The SP may also maintain an accompanying log of the events that triggered the measurements. As noted above, these measurements, as well as other measurements made by the SP before and/or after the OS kernel is booted, cannot be erased except through a reboot of the service processor and host system. Thus, starting from boot, the TPM on the SP holds an accurate recording of the software running on the service processor and host system, as well as any security relevant files. Later, measurements recorded in the PCRs are sent securely to another computing system, e.g., the verification and monitoring system, as attestation of the current state of the service processor and host system.

The integrity management subsystem, hereafter assumed to be an IMA subsystem as an example for purposes of illustration, determines which files to measure and appraise through the use of a policy which may have various levels of specificity. The identification of what files to measure and appraise is accomplished by specifying, in the policy, a set of labels. Any file that has affixed to it one of these labels, will be measured and appraised using the IMA subsystem. In some illustrative embodiments protection against accidental or malicious modification of the IMA subsystem policy itself is accomplished by including it in a digitally signed initial file system image verified and loaded at boot time. In other illustrative embodiments, such protection of the IMA subsystem policy may be accomplished by signing and validating the IMA subsystem policy itself. Other mechanisms for ensuring the security and integrity of the IMA subsystem policy may also be used without departing from the spirit and scope of the illustrative embodiments.

In addition to the mechanisms described above, various asymmetric key mechanisms, whitelist mechanisms, remote verification system measurement verification logic and analysis engine logic, and the like are provided to prevent successful attacks against service processors and/or generate alerts when such attacks are detected. These will be described in greater detail hereafter with reference to the figures. The combination of one or more of the firmware, software, security hardware, and remote verification and monitoring system mechanisms generates a secure environment that prevents service processors from executing malicious or corrupt code. Again, this is important to the functionality of secure computing systems as the service processor has direct control over other operational aspects of the host system.

Before beginning the discussion of the various aspects of the illustrative embodiments in greater detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be an apparatus or system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
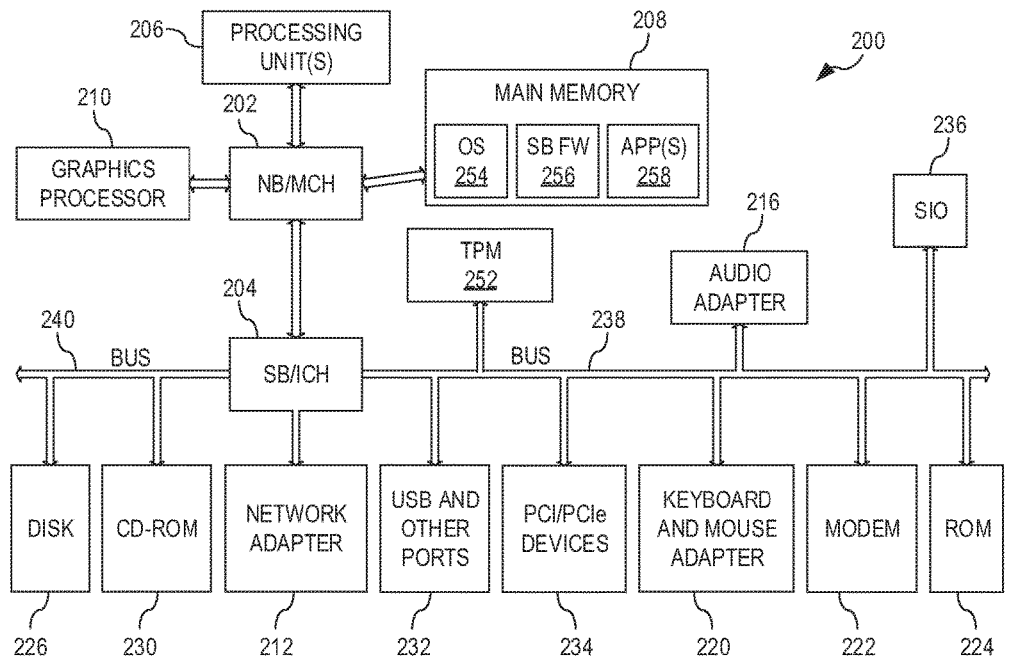
FIG. 2 is an example block diagram of a service processor in which aspects of the illustrative embodiments may be implemented.

As can be appreciated from the introduction above, the illustrative embodiments may be utilized in many different types of data processing environments in which secure computing and utilization of service processors is implemented. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables. The network 102 may be a private network, a public network, or any combination of one or more private networks and/or public networks.

In the depicted example, service processor 120 and computing device 106 are connected to network 102 along with storage unit 108 and host computing systems 110, 112, and 114 (also referred to as host systems or simply "hosts"). These host systems 110, 112, and 114 may be, for example, personal computers, network computers, servers, mainframe computers, or the like. The service processor 120 may be its own separate appliance with communication connections to network 102, or may be physically embodied in another computing device, such as computing device 104, which provides infrastructure for communicating via network 102. As such, the service processor 120 may provide functionality for booting one or more of the host systems 110-114 and/or the computing device 104, depending on the desired implementation. If booting computing device 104, then computing device 104 may be considered to be a managed computing device, e.g., a managed server. For purposes of the following description, it will be assumed that service processor 120 is a separate appliance from computing device 104 (thus, computing device 104 is shown with dashed lines), and provides functionality for booting one or more of the host systems 110-114, e.g., host system 110.

In the depicted example, one or more of service processor 120, either part of server 104 or as a separate appliance, or computing device 106 may operate as servers to the host systems 110-114 and as such, may provide data, such as boot files, operating system images, and applications to the host systems 110-114. Host systems 110-114 may thus be clients to service processor 120 in the depicted example. Distributed data processing system 100 may include additional managed servers, host systems, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, a service processor 120 is provided that is configured to implement the mechanisms of one or more of the illustrative embodiments described herein. Moreover, one or more of the computing devices, e.g., server 106, may be configured to operate as a remote verification system 130 that works in conjunction with the service processor 120 via the network 102 to perform verification and attestation operations as discussed hereafter.

The configuring of the remote server 106 to implement the verification and monitoring system 130 as well as the configuring of the service processor 120, and/or computing device 104 to include such a service processor 120 in some embodiments, may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of the service processor 120 and/or a computing device, such as server 104 or 106, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the service processor 120 and/or computing device 104, 106 is configured in one of these ways, the service processor 120 and/or computing device 104, 106 becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates secure booting and monitoring of service processors, such as service processor 120, and the host system(s), such as one or more of host systems 110-114, for example.

As shown in FIG. 1, the service processor system (SP) 120 comprises a secure trusted dedicated microprocessor 122 and an operating system 123 having an integrity management subsystem 124. The SP 120 may further comprise secure boot firmware (SBFW) 127 and communication hardware/software 128 for communicating with the host system, e.g., host system 110, and a remote verification and monitoring system 130, which may be implemented on a remotely located computing device such as server 106, for example. The SP 120 may also execute one or more applications 129. The integrity management subsystem 124 comprises measurement and appraisal logic 125 and communication logic 126 for communicating with the secure boot firmware 127, the secure trusted dedicated microprocessor 122, and the one or more applications 129.

In one example illustrative embodiment, the secure trusted dedicated microprocessor 122 is a trusted platform module (TPM) 122, the operating system 123 may be a Linux operating system with security enhancement (SE-Linux), and the integrity management subsystem 124 of the Linux operating system is an Integrity Management Architecture (IMA) subsystem 124 with measurement and appraisal functionality. This is merely used as an example architecture for purposes of understanding and is not intended to state or imply any limitation with regard to other illustrative embodiments utilizing different architectures but implementing the principles and mechanisms of the illustrative embodiments as described herein. That is, many modifications to this example illustrative embodiment may be made without departing from the spirit and scope of the present invention.

As noted above, the mechanisms of the illustrative embodiments utilize specifically configured computing devices, or data processing systems, to perform the operations for providing secure boot and monitoring of service processors, such as SP 120 in FIG. 1. These computing devices, or data processing systems, may comprise various hardware elements which are specifically configured, either through hardware configuration, software configuration, or a combination of hardware and software configuration, to implement one or more of the systems/subsystems described herein.

FIG. 2 is a block diagram of just one example of a service processor in which aspects of the illustrative embodiments may be implemented. Service processor 200 is an example of a service processor, such as SP 120 in FIG. 1, in which hardware and computer usable code or instructions implementing various ones of the processes and aspects of the illustrative embodiments of the present invention may be located and/or executed so as to achieve the operation, output, and external affects of the illustrative embodiments as described herein.

In the depicted example, service processor 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system 254 runs on processing unit 206. The operating system 254 coordinates and provides control of various components within the service processor 200 in FIG. 2. The operating system may be a commercially available operating system such as Microsoft® Windows 7®, LINUX®, or the like. An object-oriented programming system, such as the Java programming system, may run in conjunction with the operating system and provides calls to the operating system from Java™ programs or applications executing on service processor 200.

Service processor 200 may be provided as a stand-alone appliance or may be integrated into another computing system, such as an IBM LinuxONE™ computer system, Power™ processor based computer system, or the like, running the LINUX® operating system. Service processor 200 may be a single processor system, a symmetric multi-processor (SMP) system including a plurality of processors in processing unit 206, or the like.

Instructions for the operating system, the object-oriented programming system, and applications or programs are located on storage devices, such as HDD 226, and may be loaded into main memory 208, as operating system image 254 for example, for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the secure booting and monitoring of service processors.

Service processor 200 may comprise various communication connections, such as NB/MCH 202, SB/ICH 204, bus 238, and the like, to facilitate data communication between the various elements of the service processor. The service processor 200 comprises a secure trusted dedicated microprocessor which in the depicted example illustrative embodiment is a TPM 252. The service processor 200 further comprises, in main memory 208, an operating system (OS) 254, such as OS 123 in FIG. 1, having an integrity management subsystem, such as integrity management subsystem 124 in FIG. 1, which may be an IMA subsystem with measurement and appraisal logic and functionality 125. The service processor 200 may further comprise, in main memory 208, secure boot (SB) firmware (FW) 256, such as secure boot firmware 127 in FIG. 1, and may execute one or more applications (APP(s)) 258, such as applications 129 in FIG. 1. Although not shown in FIG. 2, the service processor 200 may further comprise communication hardware/software, such as communication hardware/software 128 in FIG. 1.

As noted above, the illustrative embodiments provide mechanisms for securely booting a service processor (SP), such as SP 120 or 200, and monitoring SP integrity using a combination of firmware, software, security hardware, and monitoring system design. The illustrative embodiments address the requirement to establish and maintain a known and trusted state of a SP originating from a known and trusted authority. The illustrative embodiments ensure that modifications of any security relevant files of a SP are detected, and optionally prevented, not only at boot time, but continuing throughout the operation of that SP such that the SP may serve as a foundation of trust for the host system the SP manages. Remote verification and monitoring is provided by a remotely located verification and monitoring system, such as verification and monitoring system 130 in FIG. 1, which may issue alerts when the remote verification and monitoring system detects such modifications of security relevant immutable files on the SP, e.g., those files that are used during the process of booting the host system and those that are used during operation of the host system, operating system kernel images, application executables, class files, libraries, access control lists, password files, microcode or configuration information for components of the host system and the like.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the service processor 200, managed server 104, verification and monitoring system 130 server 106, and host systems 110-114 may take the form of any of a number of different data processing systems including client computing devices, server computing devices, a tablet computer, laptop computer, telephone or other communication device, a personal digital assistant (PDA), or the like. In some illustrative examples, one or more of these computing devices may be a portable computing device that is configured with flash memory to provide non-volatile memory for storing operating system files and/or user-generated data, for example. Essentially, the computing devices shown in FIGS. 1 and 2 may be any known or later developed data processing system without architectural limitation.

Figure 3:
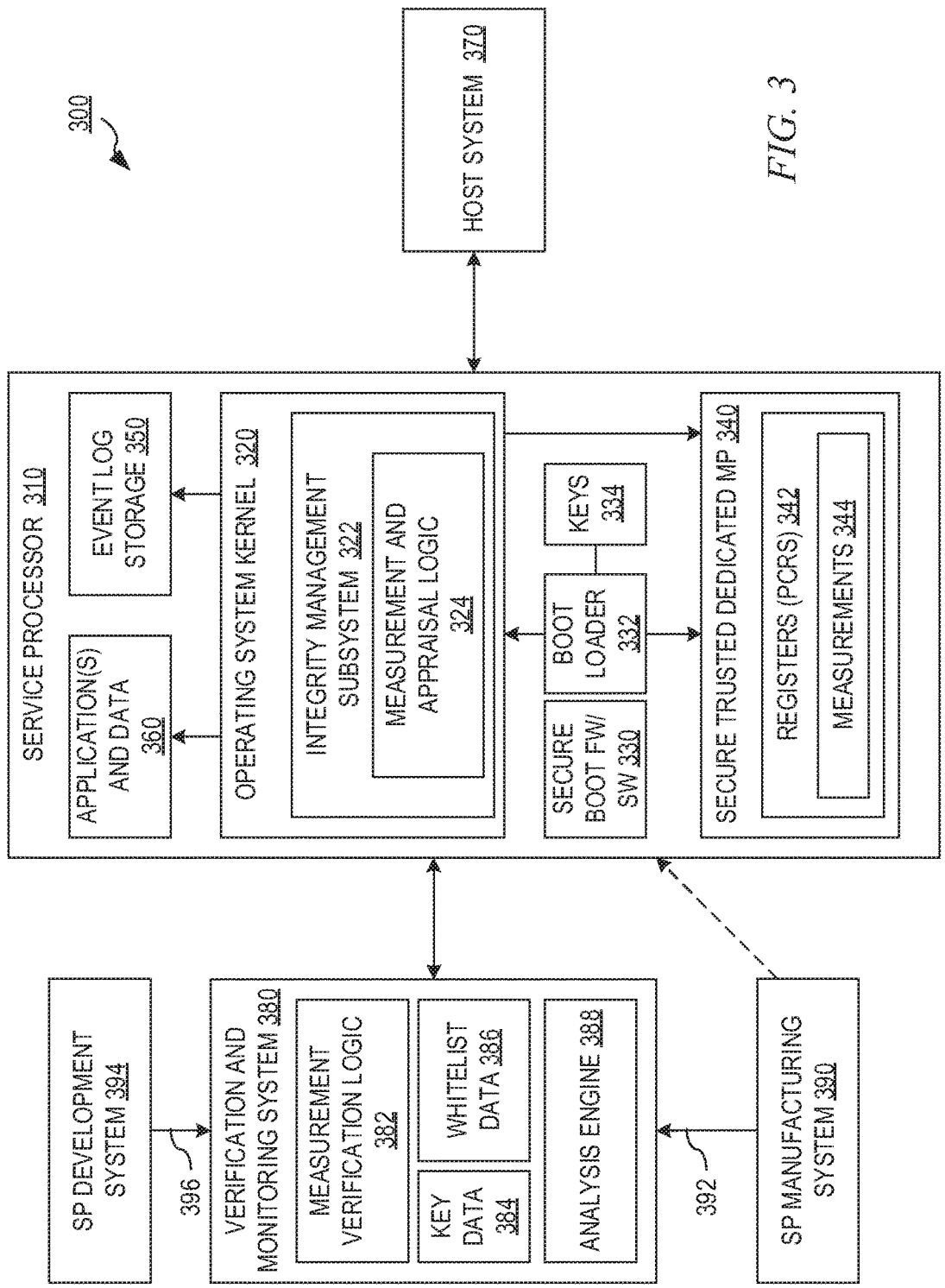
FIG. 3 is an example block diagram of a data processing system implementing a service processor in accordance with one illustrative embodiment.

FIG. 3 is an example block diagram of a data processing system implementing a service processor in accordance with one illustrative embodiment. As shown in FIG. 3, the system of the illustrative embodiments incorporates several features that work together to protect the service processor 310 of the data processing system 300. In some illustrative embodiments, this is accomplished by incorporating the use of a computer hardware implemented secure trusted dedicated microprocessor (MP) 340, such as a Trusted Platform Module (TPM), secure boot firmware and trusted or measured boot software 330, and an operating system kernel 320, such as a Linux operating system kernel for example, with integrity management subsystem 322 support available and enabled, such as the Integrity Management Architecture (IMA) subsystem, or the like. It should be appreciated that while the depiction in FIG. 3 shows the service processor as a separate element from host system 370, in some illustrative embodiments, the service processor 310 may in fact be part of the host system 370 or the host system 370 and service processor 310 may be physically embodied in a same computing device while the verification and monitoring system 380 is provided in a remotely located computing device.

In accordance with the mechanisms of the illustrative embodiments, the secure trusted dedicated microprocessor 340, e.g., TPM, is a tamper resistant microprocessor with a small amount of secure, persistent memory, cryptographic accelerators, and configuration registers 342, e.g., Platform Configuration Registers (PCRs). The secure trusted dedicated microprocessor 340 performs cryptographic operations and protects the integrity of hash chains of measurements 344 of software, configuration information, and data on the host system 370. Additionally, the secure trusted dedicated microprocessor 340 provides authentication (ensuring that the platform can prove that it is what it claims to be) and attestation (a process helping to prove that a platform is trustworthy and has not been breached).

With the mechanisms of the example illustrative embodiments, the secure trusted dedicated microprocessor 340 inside the SP 310, records measurements 344 of software, configuration information, and data, any of which may influence the security state of the SP 310. These measurements 344 are protected inside the secure trusted dedicated microprocessor 340 in the form of a hash chain stored in the registers 342. Software running on the SP 310 determines which measurements are recorded, as described further herein below. Those measurements 344 are associated with event logs, i.e. entries, in the event log storage 350. The secure trusted dedicated microprocessor 340 inside the SP 310 also generates authentic attestation values that are verified by the verification and monitoring system 380.

Specifically, whenever the service processor 310 is booted, a secure boot of the service processor 310 will occur. Secure boot firmware and software 330 may be used to boot the service processor 310 and host system 370 and may be implemented in many different ways. One example implementation of the secure boot firmware and software 330 may be the Unified Extensible Firmware Interface (UEFI) firmware. The secure boot firmware and software 330 may boot and verify that a first level boot loader 332 was digitally signed by a private key corresponding to a public key configured in (or managed by) the secure boot firmware and software 330. Software and data integrity public keys 334 used to verify digital signatures of firmware and software are not secret, but nevertheless, they must be protected from unauthorized modification and may be stored in hardware-protected persistent memory, such as flash memory, within the SP 310 or embedded in or accompany the verifying firmware or software, such as secure boot firmware and software 330. For illustration purposes, these keys are shown as element 334 in FIG. 3.

The first level boot loader 332 ensures that any operating system (OS) kernel image 320 subsequently booted was digitally signed by a private key corresponding to a trusted public key configured in the first level boot loader 332. As noted previously, the first level boot loader 332 may load a second level boot loader (not shown) instead of an OS kernel image 320. If so, the first level boot loader 332 may verify the digital signature of the second level boot loader using a protected software and data integrity public key 334 trusted by the first level boot loader 332. Subsequently, the second level boot loader may validate the OS kernel image 320 that it loads. This may continue for any number of levels of boot loaders. The first or second level boot loader may also load executable code, microcode, or configuration information, into other subsystems or components (not shown) of the SP 310, in which case, it will verify the digital signature of each object loaded.

In accordance with one or more illustrative embodiments, the secure trusted dedicated microprocessor 340 is used as a root of trust for measurement by the recording of a hash chain of measurements 344 of the operating system kernel 320, the applications and immutable data 360, and any other data relevant to the security state of the SP 310, such as its current hardware configuration and boot parameters. The SP 310 also maintains the accompanying event logs in the event log storage 350, where the event logs detail the events that triggered the measurements performed by the measurement and appraisal logic 324 of the integrity management subsystem 322 which are stored in the hash chain of measurements 344 in the registers 342. More specifically, during the boot process, measurements 344 of all operating system kernel 320 and application software 360 are recorded in the registers 342, e.g., PCRs, inside the secure trusted dedicated microprocessor 340 before the software is executed. Measurements 344 can never be erased except through a reboot of the host system 370. Thus, the secure trusted dedicated microprocessor 340 holds an accurate recording of the software booted on the SP 310, starting from the boot operation. Later, measurements recorded in the registers 342 are sent securely to the verification system 380, as an authentic attestation of the current state of the SP 310.

As previously mentioned, a secure boot of the SP 310 occurs using secure boot firmware and software 330, which in some illustrative embodiments may be Unified Extensible Firmware Interface (UEFI) firmware/software. The secure boot firmware/software 330 may verify one or more boot loaders 332 to ensure that they are digitally signed by a private key corresponding to a public key 334 configured in (or managed by) the secure boot firmware/software 330. At some level of boot loader, dependent on the desired implementation, a boot loader loads the OS kernel image 320 and ensures that the OS kernel image 320 is digitally signed by a private key corresponding to a trusted public key configured in the boot loader. The secure trusted dedicated microprocessor 340 is used as a root of trust for measurements both before and after booting of the OS kernel 320 with these measurements being stored in the secure trusted dedicated microprocessor 340 as a hash chain of measurements of the software the SP 310 has booted. Moreover, an accompanying log of the events that triggered the measurements 344 is also maintained in event log storage 350.

During and after a successful secure boot of the OS kernel 320 (with accompanying pre-OS level of execution measurements and logging), the OS kernel 320 runs with integrity management subsystem 322 support enabled, e.g., IMA enabled. The integrity management subsystem 322 verifies that all system sensitive files opened by the OS kernel 320 have a valid digital signature or match a predetermined hash value, and that the contents of the files have not changed since their corresponding signatures or hashes were generated. These operations are called appraisal operations and may be performed by measurement and appraisal logic 324 of the integrity management subsystem 322, which may be implemented as hardware and/or software executing on hardware. That is, the measurement and appraisal logic 324 provides the functionality of the integrity management subsystem 322 for performing measurements of the operating system and application software being booted and appraisal of the integrity of the system sensitive files. In accordance with the mechanisms of one or more of the illustrative embodiments, integrity management subsystem appraisal operations are not limited to boot time, or to the first time that a file is accessed, and may continue until the next boot cycle. For performance, in some illustrative embodiments, the integrity management subsystem 322 measurement and appraisal logic 324 may perform appraisal operations on a file the first time the file is accessed, and then again only when the file has been changed. In addition, if the file has an applicable FILE CHECK policy rule, the integrity management subsystem 322 may prevent signed files from being opened for write.

The SP 310 may be configured such that the integrity management subsystem 322 runs in either an enforcing or logging mode of operation. In an enforcing mode, if any verification operation executed by the verification and monitoring system 380 fails, the measurement and verification system 380 may output a notification, and/or the SP 310 via the host system 370 may output a notification, that the SP 310 and/or host system 370 is compromised and then terminate all services of the service processor 310. In logging mode, the SP 310 will log the verification failure, such as in the event log storage 350, but will continue to execute its operations with regard to governing the host system 370.

In addition to recording measurements of booted software, in one or more illustrative embodiments, the SP 310 also records measurements 344 of executable files and security relevant files before they are executed or opened. As is done at boot time, these measurements 344 are recorded in the registers 342 in the secure trusted dedicated microprocessor 340. The SP 310 may also maintain an accompanying log of the events that triggered these measurements 344 of the executable files and security relevant files. As noted above, these measurements 344, as well as other measurements made by the SP 310 cannot be erased except through a reboot of the host system 370. Thus, starting from boot, the secure trusted dedicated microprocessor 340 holds an accurate recording of the software running on the host system 370 and of any security relevant files. Later, measurements 344 recorded in the registers 342 are sent securely to the verification and monitoring system 380 as attestation of the current state of the host system 370.

The integrity management subsystem 322 determines which files to measure and appraise through the use of a policy which may be configured in the integrity management subsystem 322. The policy may have various levels of specificity such as a more general policy of the type "appraise all executables," a very specific policy such as "do not appraise log files," or any level of specificity suitable to the particular implementation. In some illustrative embodiments, the SP 310 has a custom policy that directs the integrity management subsystem 322 to measure and appraise all security relevant immutable files on the SP 310 that are delivered by the manufacturer of the SP 310. A file is considered immutable if it is not expected to be changed during the course of operating the SP 310. For example, kernel modules and application executable files are considered immutable in the SP 310. Mutable files, on the other hand, are expected to change during the course of operating the SP 310. These files are not protected by the policies implemented in the integrity management subsystem 322 because they cannot be digitally signed or matched against a predictable hash. For example, a configuration file that is used to save customer specific data is considered to be mutable.

The identification of what files to measure and appraise by the measurement and appraisal logic 324 may be accomplished by specifying, in the custom policies stored in the configuration data of the integrity management subsystem 322 and applied by the execution of the integrity management subsystem 322, a set of labels or identifiers. Labels are "affixed" to files as an extended attribute, e.g., file system metadata. Any file that has affixed to it one of these labels or identifiers, will be measured and appraised by the measurement and appraisal logic 324 of the integrity management subsystem 322. In some illustrative embodiments protection against accidental or malicious modification of an integrity management subsystem policy itself is accomplished by including the policy in a digitally signed initial file system image verified and loaded at boot time. In other illustrative embodiments, such protection of the integrity management subsystem policy may be accomplished by signing and validating the integrity management subsystem policy itself. Other mechanisms for ensuring the security and integrity of the integrity management subsystem policy may also be used without departing from the spirit and scope of the illustrative embodiments.

As mentioned above, the specification of what files to measure and appraise is accomplished through the use of affixing labels or identifiers to files. In some illustrative embodiments, such as where the OS kernel 320 is implemented as a Linux kernel, SELinux labels may be used for this purpose. These labels allow the integrity management subsystem 322 to specify what files to measure and appraise at a level of detail as granular as specific files in specific directories. In addition to supporting the affixing of labels to files, SELinux may be used to provide mandatory access control support to the Linux OS kernel 320 in these embodiments. Standard Linux access controls, such as file modes (-rwxr -xr -x) are modifiable by the user and the applications which the user runs. However, SELinux access controls are determined by a policy loaded on the service processor 310 which may not be changed by users or misbehaving applications. Since attacks on service processors, such as SP 310 from remote users who gain root privileges are a concern, the illustrative embodiments provide secure boot, operating system policy protections, such as SELinux type protections, and integrity management subsystem protections to prevent any modification of the operating system and integrity management subsystem policies and corresponding file labels, even by users with root privileges.

As mentioned previously, the operating system kernel 320 of the service processor 310 records auditable events in the event log storage 350 as event logs or entries. When the operating system kernel 320, using the integrity management subsystem 322 and its measurement and appraisal logic 324, records measurements 344 in the registers 342 of the secure trusted dedicated microprocessor 340, the operating system virtually simultaneously records additional information about those measurements in an event log or entry in the event log storage 350. At the pre-OS level of execution, the entry is referred to as an "event log" but at the OS level of execution, the entry may also be referred to as an entry of a "measurement list," however for purposes of clarity these will be collectively referred to as "event logs" or simply "logs" herein. These logs include the same measurement data 344 that was recorded in the registers 342 of the secure trusted dedicated microprocessor 340, along with information about the registers 342 in which that measurement data 344 was recorded, and a hint about the event with which the measurement data 344 corresponds. For example, if a triggering event is that an executable file is about to be executed, then the log may include the register number of the particular register in registers 342 where the measurement data is stored, a hash of the executable file, and a hint as the full path and filename of the executable file. The hint may not be recorded in the secure trusted dedicated microprocessor 340 registers 342, thus it can be changed without detection. It is used during verification, to help locate a hash without performing an exhaustive search of the white list. An example of a log entry follows, where "10" is the register identifier, the data immediately following "sha256:" is the file hash, "/usr/lib/systemd/systemd" is the hint, with the remainder of the contents being the digital signature of the file:

responsible for recording measurements and logs for pre-OS level execution while the integrity management subsystem 322 may be responsible for recording measurements and logs for OS level execution in the SP 310. These logs are sent to the verification and monitoring system 380 as described in greater detail hereafter.

As mentioned previously, the SP 310 uses the measurements 344 stored in the registers 342 of the secure trusted dedicated microprocessor as a mechanism for performing attestation with the verification and monitoring system 380. Attestation may be defined as a process by which a trusted, and possibly remote, party (verifier) checks the internal state of an untrusted, and potentially compromised, device (prover). In accordance with one or more of the illustrative embodiments, an attestation proof, also called a "quote," is a digital signature over a hash of the selected register 342 values (e.g., UEFI and measurements 344), and information about the boot cycle (so that reboots can be reported). The quote includes a freshness nonce, i.e. an arbitrary value that can only be used once, so that a previous quote cannot be replayed. With a level of indirection via the registers 342, the quote is effectively a signature over the measurements 344 in the secure trusted dedicated microprocessor 340 and logs in the event log storage 350.

In some illustrative embodiments, the SP 310 is the "prover" and the verification and monitoring system 380 is the "verifier." At a scheduled and regular basis, or in response to particular events that occur as configured in the service processor 310, or at random or pseudo-randomly generated times, these measurement 344 values, in addition to other information about the system and files, are securely transmitted to the verification and monitoring system 380 at a secure location where the verification and monitoring system 380 performs analysis of the received data. The exchange may be protected from Man in the Middle (MI™) attacks through a specific configuration of authenticated sockets and may be protected from replay attacks through the use of a nonce that is generated by the verification and monitoring system 380 which may be sent to the service processor 310 by the verification and monitoring system 380 and returned from the service processor 310 as part of the data sent to the verification and monitoring system 380 for analysis.

The SP 310, which is to be monitored by the verification and monitoring system 380, may be registered with the verification and monitoring system 380. The registration process installs the public key of the secure trusted dedicated

```
10
5adacad22c140736ef62c30adc4898edf5c61d3c ima-sig
sha256:383be457901773abc5055c6b27f819179f885ef319e40ee2b311ab05e4873015
/usr/lib/systemd/systemd
030204d1aa07be0100ec319ffae86437e6a829d64ca16b513a4d56efa9e8919316dc80fc
32693c4b47e3d030985295e811b16d63e075dd0caa4f6d1041fb7b338e60c03006ef532
45576df25573a59592de897994b6c9990cfcea79113f2546b4ec34fc5b622f56005bdf
c24f00d0dff77e0dalf154e504b09d5e77df62794ccac704ba2aa9afdd272c04d303b706
fae011b8dd4051652c3f1741b6792ba6e6035cbfc043f5ade026d5aa1b949ec68bceca6c
18390e3146402d353b5ab0a01bdefd7b6bcb3ac0c19f67
```

In accordance with one or more of the illustrative embodiments, the secure boot firmware and software 330 and the integrity management subsystem 322 of the operating system kernel 320 in the SP 310 are responsible for creating the event logs and measurement lists, i.e. the "logs", when events are recorded in the secure trusted dedicated microprocessor 340, e.g., a trusted platform module (TPM). For example, the boot firmware and software 330 may be microprocessor's 340 quote signing key and the system serial number of the service processor 310 at the verification and monitoring system 380 (verifier) in order to ensure that any subsequent quote is authentic and that it originated in the specific secure trusted dedicated microprocessor 340 associated with the registered service processor (SP 310).

In some illustrative embodiments, when a service processor, such as SP 310, is manufactured, asymmetric keys (not shown) are generated inside the secure trusted dedicated microprocessor 340 located within a service processor 310. The public keys associated with the generated key pairs, along with information identifying the specific service processor 310 being manufactured, are sent to and registered in the verification and monitoring system 380 as key data 384. The transmission of the registration data is performed over a secure private channel 392. Later, when the service processor 310 is in use, the measurement verification logic 382 of the verification and monitoring system 380 will verify the measurements collected on the service processor 310. That is, the public keys for the service processor 310 stored in the key data 384 are used by the measurement verification logic 382 of the verification and monitoring system 380 to verify the authenticity of the data sent from the service processor 310.

In some illustrative embodiments, in addition to the other mechanisms noted above for ensuring security of the service processor 310, a whitelist is generated at the system that prepares the service processor software for shipment, which may be the SP manufacturing system 390 or another computing system associated with as service processor software provider, such as a software development or lifecycle management system 394 via secure communication link 396 (SP manufacturing system 390 and software development system 394 may be collectively referred to as SP provider systems). The whitelist is a list of applications and application components that are authorized for use in an organization. The whitelist, in accordance with some illustrative embodiments, consists of hash values of immutable files, and are calculated and registered for every possible combination of software that can be run on the service processor 310, starting with the initial release and including every service update thereafter.

Each level of software is given a unique identifier so that the hash values can be correlated to the software level. The whitelist hash values and software levels are transmitted to the verification and monitoring system 380 over a secure private channel, such as channel 392 in embodiments where the SP manufacturing system 390 provides the software. The whitelist hash values and software level information may be stored in the verification and monitoring system 380 as whitelist data 386. The verification and monitoring system 380 uses the whitelist and software level data 386 to perform validation of the security state of service processors, such as service processor 310. As the verification and monitoring system 380 may perform verification and monitoring for a plurality of different service processors, the key data 384 and whitelist data 386 may store information for a plurality of different service processors. The whitelist hash values and software level data 386 may be backed up in case the verification and monitoring system 380 must be recovered. Additionally, hash values for multiple software levels may be maintained, in case the service processor software needs to be rolled back to an earlier valid software level.

As mentioned above, the service processor 310 communicates with the verification and monitoring system 380, located in a secure environment, to perform remote verification of the measurements 344 stored in the secure trusted dedicated microprocessor 340, e.g., TPM, and further recorded in the logs of the event log storage 350. Trust in the results of this verification operation by the verification and monitoring system 380 is rooted in the secure trusted dedicated microprocessor's quote signing public key, which is generated and recorded during registration, as discussed above. The verification operation, performed by the measurement verification logic 382 of the verification and monitoring system 380, uses the registered quote signing public key to validate the digital signature of the quote data, i.e. the quote having hash values of the measurements 344 from the registers 342 of the secure trusted dedicated microprocessor 340. Next, the verification and monitoring system 380 uses the measurement values in the log entries of the event log storage 350 to attempt to reproduce the measurement value 344 hash in the digitally signed quote data. If successful, the measurements (hashes) recorded in the log are determined to be authentic and unmodified. At that point, additional analysis by analysis engine 388 can be performed on the data. When verifying measurement lists logs in the event log storage 350, i.e. log entries created at the (OS layer of execution), additional steps may be performed over and above the quote signature verification and register 342 comparison. Event data (also known as "template" data in the IMA subsystem), such as the file name and its hash, may be validated against the event log entry in the event log storage 350. Once verified with the quote signature verification and register comparison, additional analysis against the whitelist 386 may be performed on the file hashes.

Thus, the verification and monitoring system 380 verifies whether or not the data from the service processor 310 is authentic, i.e. from the correct service processor, and whether or not the measurement data has been compromised. If there is a problem detected during verification, then the verification and monitoring system 380 raises an alert and outputs a corresponding notification to a system administrator or other authorized person and/or logs the incident in an error log (not shown). If, however, no problems are found with the data, i.e., it is authentic and unmodified, then additional analysis can be performed by the analysis engine 388.

In some illustrative embodiments, the analysis engine 388 analyzes the service processor's state in a manner that allows for the inputs to be dynamic and extend beyond the initial boot of the system. Additionally, the illustrative embodiments may perform optimizations that reduce the amount of processing required by the analysis engine 388 to analyze the data. One example of analysis is to ensure that the measurement values 344 recorded in the registers 342 represent correct expected values for the host system 370 at the code level installed on the host system 370.

An error situation arises when a previous version of a file is validly signed, but may be outdated or "back level". A file is considered back level if a newer version of the file is available and contains fixes, some of which may fix security vulnerabilities. As a result, a back level file may contain security vulnerabilities. In this situation, each file is individually signed and verified, but collectively, the overall configuration is not, so the verification and monitoring system 380 consults the whitelist.

The verification and monitoring system 380 compares the hash value listed for each file included in the logs of the event log storage 350 against the hash values maintained in the whitelist data 386 for the specific code level of the service processor 310. The term "code level" refers to a specific bundle of code and all bundles released before it along with the base code level. That is, when a product is released, the product consists of a set of files referred to as the base/initial code level. As problems in the file(s) are fixed, the files are changed and often these changes are bundled together. Each bundle is developed in a way such that it applies "on top of" any previous bundle(s). The changes and bundles are cumulative and can be thought of as a "level of code". Therefore, a "code level" refers to a specific bundle of code and all bundles released before it along with the base code level.

If any comparison fails, if there are files in the logs that are unexpected, or if there are any files in the logs that are missing from the whitelist data 386, the discrepancy is recorded in an error log and appropriate notifications are sent to system administrator or other authorized personnel, either through an output on the verification and monitoring system 380 or via a transmission to another computing device which outputs the notification for presentation to the system administrator or other authorized personnel.

In some embodiments, updates to files and/or data operated on by the SP 310, such as changes to applications and data 360, may be performed either on regular update cycles and/or dynamically apart from any regular schedule of updates. In such situations, an originally registered whitelist 386 provided by a SP provider system, e.g., 390 or 394, may not be accurate to the updated files and/or data and thus, a discrepancy may be detected even though the updates may have been authentic and authorized. On the other hand, such updates may not be authentic or authorized, either because a third party unauthorized interloper has attempted to hack or otherwise compromise the SP 310, or because the SP 310 is executing out-of-date files or operating on relatively old data.

Thus, as another example of analysis that may be performed by the analysis engine 388 may be to perform authentication and authorization operations based on the measurement values recorded in the registers 342 and reported by the SP 310 to the verification and monitoring system 380. That is, information about the applications and code executed by the SP 310, and/or data operated on by the SP 310, as well as other information represented in the measurements 344 maintained in the registers 342, may be used as a basis for performing authentication and authorization operations to ensure that the service processor 310 is executing authorized and authentic code on authorized and authentic data and has a corresponding authorized and authentic configuration. In this way, potential hacks or compromises by third party interlopers may be detected and appropriate action may be performed.

For example, the measurements may indicate that a particular version of an application 360 was executed by the service processor 310. The version of the application 360, identification of the service processor 310, etc. may be communicated to a SP provider system, e.g., system 390 or 394, for verification, or the SP provider system may have already provided information indicating authentic and authorized versions of applications that may be executed by the service processor 310, such as in the form of an updated whitelist data structure 386, for example. The version information may be compared to authentic and authorized versions for the particular SP 310 to determine whether the current state of the SP 310 is secure. Such authentication and authorization may result in a number of possible outcomes: (1) the version is authentic and authorized—SP is secure; (2) the version is authentic, but not authorized—SP is secure but not in an authorized state, i.e. executing older applications and/or using older data; (3) the version is not authentic and not authorized—SP is not secure and is likely compromised; and (4) the version is not authentic, but is authorized—change to applications and/or data occurred by authorized operator at SP 310—SP secure.

In any of the outcomes other than (1) above, appropriate logs and/or alert notifications may be output by the verification and monitoring system 380 and/or SP 310 to inform authorized persons of the state of the SP 310 and/or host system 370 so that appropriate action may be performed. Thus, unless the SP 310 is executing applications or code on data where both are authorized and authentic, some level of potential compromise may be determined to exist with the state of the SP 310 and thus, an appropriate notification or log entry may be generated. In this way, appropriate action may be taken either manually or automatically to respond to potential threats to the SP 310 and host system 370. For example, with regard to outcomes (2) and (3) above, services provided by the SP 310 may be discontinued, such as when the SP 310 is operating in an enforcement mode of operation, so as to avoid execution of out-of-date code or use of out-of-date data, or to minimize the harm that a compromise of the SP 310 and/or host system 330 may cause. In the case of outcomes (2) and (4), appropriate authorized personnel may be notified of the discrepancies between versions of the applications/data and appropriate action taken to either update whitelist data structures or install updates on the SP 310, for example.

In some illustrative embodiments, updates to the applications and data 360 or other files executed by the operating system kernel 320, may occur at regular update cycles. Moreover, in some instances, the SP provider system may not send a priori, the whitelist data structure 386. In such embodiments, the analysis engine 388 may perform analysis operations to ensure that the measurements 344 have not changed since the last analysis performed by the analysis engine 388, i.e. the previously reported and verified measurements from the SP 310 are used as a baseline or dynamic whitelist against which the current measurements are compared. If a change is detected by the analysis engine 388, this change may be an authorized and authentic change or it may be due to a compromise of the security of the service processor 310 or host system 330. If the change occurs at the regular update cycle by an authorized local operator who is allowed to make changes to files and/or data, i.e. the local operator logs into the SP 310 using credential information which is then recorded as part of an event log entry indicating when and who made the changes to the applications and data 360, then the change may be considered authorized and authentic and the current measurements may be stored by the analysis engine 388 in association with an identifier of the SP 310, such as in an updated whitelist data structure 386.

If the changes occur between update cycles, without proper credential information being recorded in the event log 350 for example, such changes may be considered to be compromises of the security of the SP 310 and/or host system 330 in which case appropriate actions, e.g., logging, sending of alert notifications, and/or disabling of services by the service processor 310, may be performed. The analysis engine 388 may check event log entries in the event log storage 350, as may be reported to the verification and monitoring system 380 by the SP 310 when providing measurements for verification, for updates or changes to the applications and data 360 to determine if appropriate credentialed sources are the source of the changes. If so, then, the current state of the measurements may be considered to be an update to the whitelist data structure 386 and stored accordingly in the verification and monitoring system 380. Thus, a dynamic whitelist data structure 386 may be generated with each update cycle.

Figure 4:
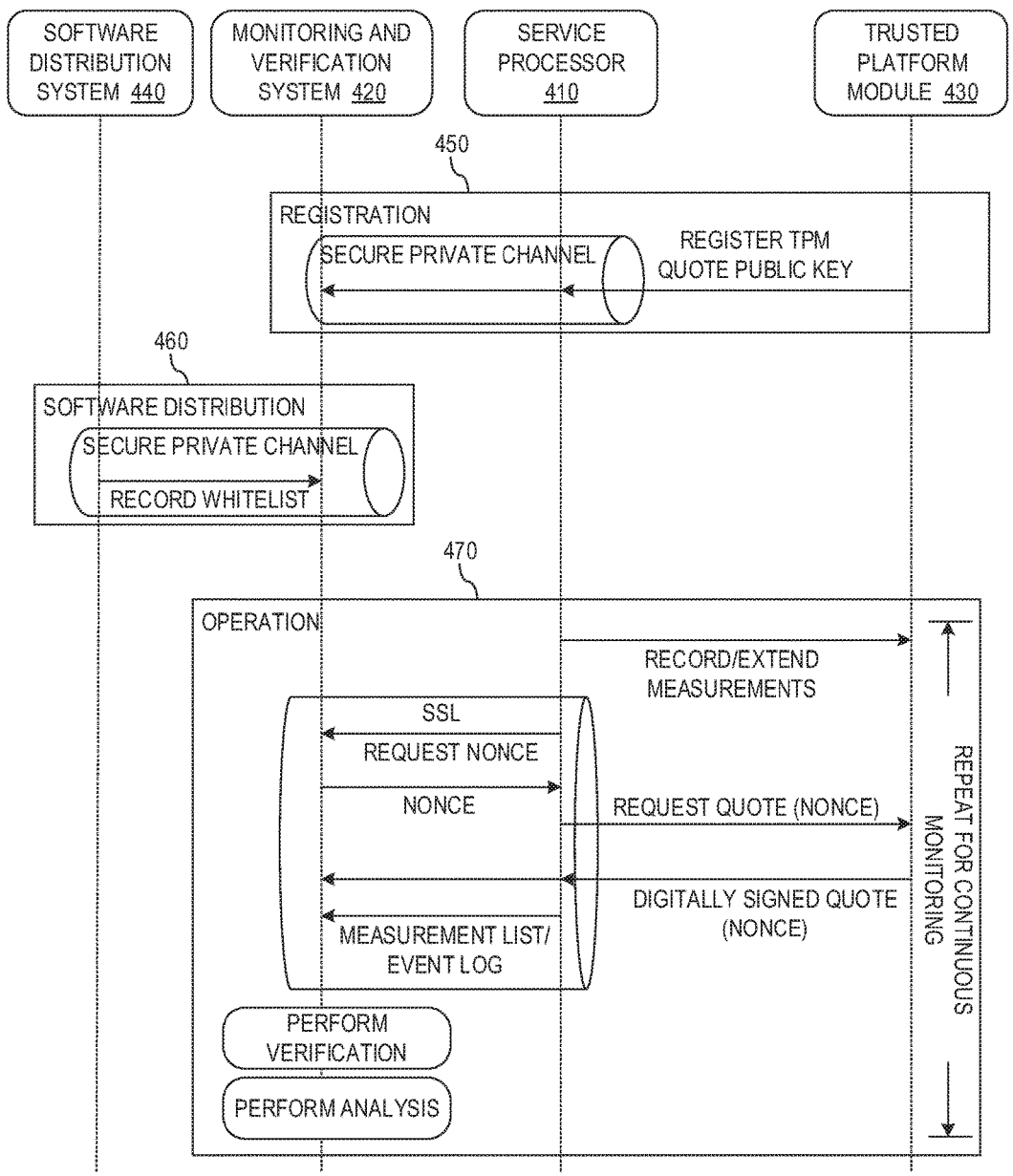
FIG. 4 is an example diagram illustrating an attestation protocol in accordance with one illustrative embodiment.

FIG. 4 is an example diagram illustrating an attestation protocol in accordance with one illustrative embodiment. FIG. 4 shows the registration process, software distribution process, and operation of the service processor as separate operations with interactions between the corresponding systems and hardware elements of the service processor. These interactions ensure that the information being verified and monitored comes from an actual secure trusted dedicated microprocessor in a known, registered service processor. These interactions provide defenses against attacks, such as a man in the middle attack in which an attacker intercepts the communication between two parties in order to alter the contents of the communication, for example to convince the verification and monitoring system that the service processor is secure, when, in fact, it has been attacked. These interactions also provide defenses against replay attacks, in which an attacker captures, then later "replays," valid communications between the parties, for example, to replay previous proof that the service processor is secure, when it is no longer in that state.

With regard to a registration process 450, as is shown in FIG. 4, the secure trusted dedicated microprocessor 430 registers itself and its corresponding service processor 410 with the verification and monitoring system 420 by providing a quote to the service processor 410 and to the verification and monitoring system 420 via a secure private channel. The quote includes the public key(s) corresponding to the private keys associated with the secure trusted dedicated microprocessor 430 of the service processor 410. In addition, as part of the software distribution operation 460, a software distribution system 440, which may be a service processor manufacturer system or other computing system associated with a provider of software to be executed by the service processor 410, sends whitelist data to the verification and monitoring system 420 via a secure private channel.

With regard to the regular operation 470 of the service processor 410 after registration and software distribution, as illustrated with the example depicted embodiment, the service processor 410 begins the verification process by periodically requesting a nonce, e.g., a random number, alphanumeric value, or the like, from the verification and monitoring system 420. This nonce is used to prevent replay attacks.

When the service processor 410 receives the nonce from the verification and monitoring system 420, it forwards it inside a quote request to the secure trusted dedicated microprocessor 430, e.g., the TPM, resident in the service processor 410. The secure trusted dedicated microprocessor 430 then provides a digitally signed quote response to the service processor 410. Next, the service processor 410 sends the quote response, along with the corresponding log data maintained by the OS kernel, to the verification and monitoring system 420. The verification and monitoring system 420 already has (through the registration process as described above) the public key associated with the private key that the secure trusted dedicated microprocessor 430 used to digitally sign the quote. Therefore, the verification and monitoring system 420 can authenticate, through the "perform verification" operation, that the secure trusted dedicated microprocessor 430 quote data is valid and comes from the intended service processor 410 and host system. In addition, the secure trusted dedicated microprocessor 430 quote data may be used, as part of the "perform analysis" operation, to validate that event and measurement list logs have not been tampered with, by using the values in the logs to simulate the secure trusted dedicated microprocessor 430 operations that record measurements in the hash chain, and then verifying that the resulting simulated measurement values in the registers match the actual final register values contained in the quote data.

This process may be repeated for continuous monitoring of the service processor 410 to ensure secure operation of the service process. It should be noted that the illustrative embodiments utilize hardware to protect the registers and the operations performed on them and the data that they contain. This hardware, whether it is a secure trusted dedicated microprocessor 430 or a more general purpose HSM, provides tamper protection and logical isolation of the registers.

Figure 5:
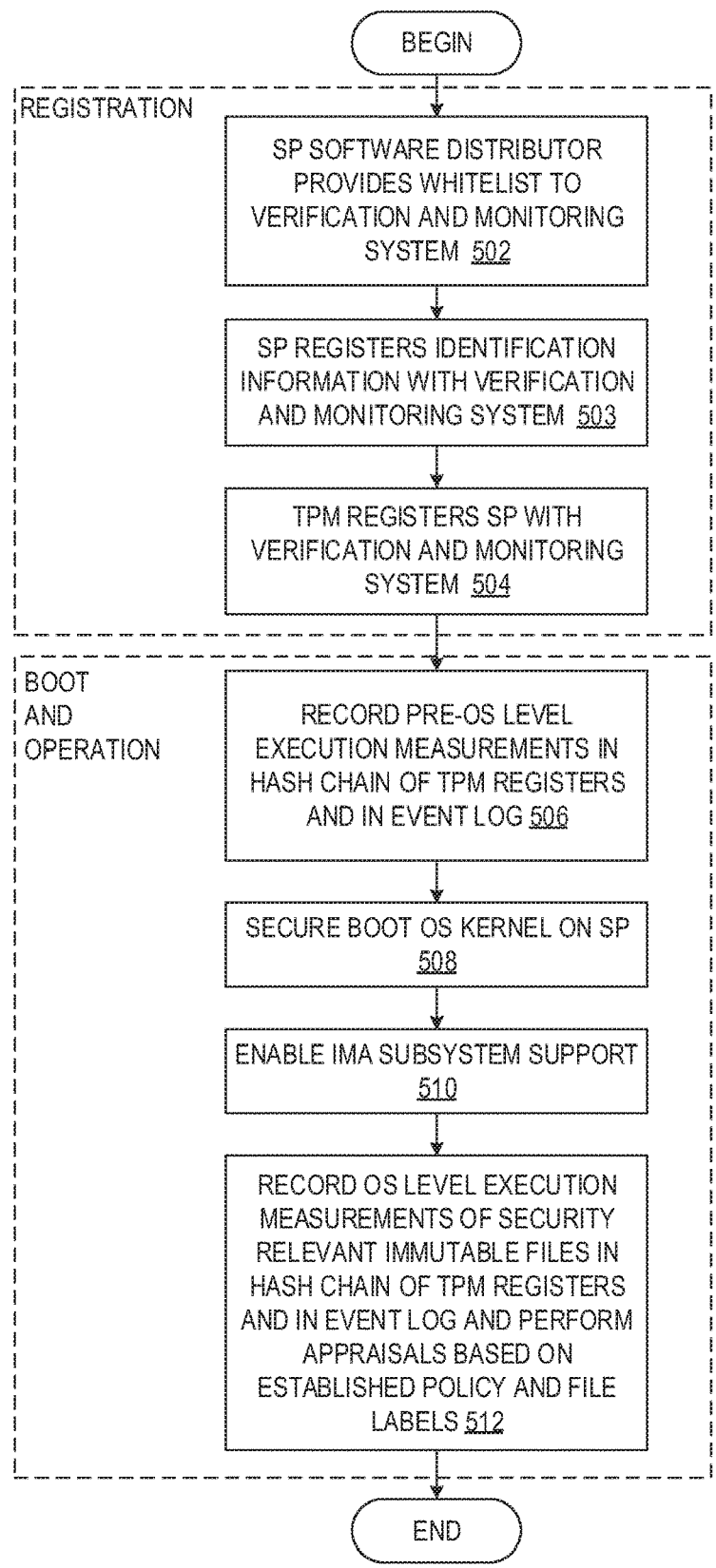
FIG. 5 is a flowchart outlining an example operation for performing a boot operation of a service processor in accordance with one illustrative embodiment.

FIG. 5 is a flowchart outlining an example operation for registering, booting, and operating a service processor in accordance with one illustrative embodiment. As shown in FIG. 5, the registration operation starts with the service processor software distributor generating and providing whitelist data for the service processor to a verification and monitoring system (step 502) which stores that whitelist information for analysis purposes. The service processor registers with the verification and monitoring system by providing identification information about itself, such as model and serial number, media access control address, hardware configuration, and date and place of manufacture (step 503). The secure trusted dedicated microprocessor, which in this example is a trusted platform module (TPM), of the service processor registers with the verification and monitoring system by providing public key information corresponding to the TPM's private keys (step 504). The registration operation steps 502-504 may be performed in any order, but all generally complete prior to commencing the booting operation (step 506). There may be a large gap of time before step 506 occurs. It is expected, but not required, that registration steps 502-504 take place in a manufacturing or system provisioning facility, whereas the steps of booting (506) through operation (512), take place wherever the host system is ultimately located and operated. The service processor boots the OS kernel using secure boot firmware and software of the service processor (step 506). While the secure boot is occurring, the secure boot firmware and software records measurements in the hash chain of the registers, e.g., PCRs, of the TPM and corresponding logs in the event log storage of the secure processor (step 508).

As the operating system kernel is booting, the integrity management subsystem, e.g., an IMA subsystem, of the operating system kernel is enabled (step 510). The integrity management subsystem is configured with policy information that indicates which security relevant immutable files on which to perform measurements, appraisals, and for which to generate corresponding logs. During booting and during operation of the service processor, the integrity management subsystem records operating system level execution measurements of security relevant immutable files in the hash chain of the TPM's registers, e.g., the PCRs, and corresponding logs in the event log storage of the service processor, as well as performs appraisals, all based on the established policy and file labels associated with the files accessed by the service processor (step 512). The integrity management subsystem continues to log events, measure, and appraise for as long as the service processor is in operation. The operation (512) terminates only when the service processor is shut down, and cannot be circumvented while in operation.

Figure 6:
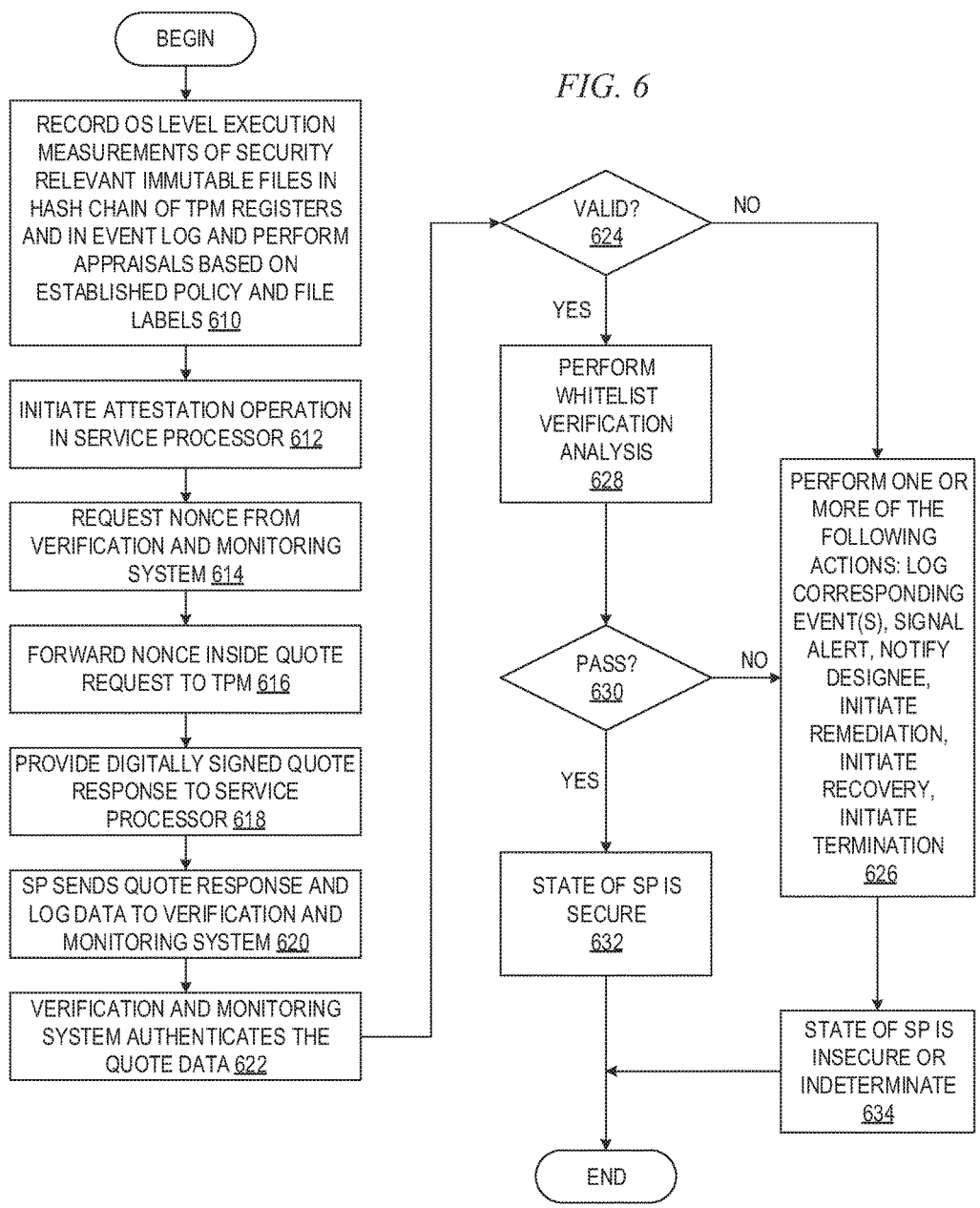
FIG. 6 is a flowchart outlining an attestation operation in accordance with one illustrative embodiment.

FIG. 6 is a flowchart outlining an attestation operation in accordance with one illustrative embodiment. The operation of FIG. 6 overlaps that of FIG. 5 with regard to step 512 and the recording of measurements, performance of appraisals, and generating of logs in accordance with established policies and file labels. The operation outlined in FIG. 6 adds additional functionality for performing attestation of these measurements stored in the TPM registers with a remote verification and monitoring system.

As shown in FIG. 6, the operation starts with a similar step 610 to that of step 512 in FIG. 5 in which the integrity management subsystem records operating system level execution measurements of security relevant immutable files in the hash chain of the TPM's registers, e.g., the PCRs, and corresponding logs in the event log storage of the service processor, as well as performs appraisals, all based on the established policy and file labels associated with the files accessed by the service processor. At a later time, such as periodically, in response to an event, or the like, the attestation operation is initiated (step 612). Via a secure socket connection, the service processor begins the attestation and verification process by requesting a nonce, e.g., a large random number or the like, from the verification and monitoring system, which is used to prevent replay attacks (step 614).

In response to receiving the nonce from the verification and monitoring system, the service processor forwards the nonce inside a quote request to the secure trusted dedicated microprocessor, e.g., the TPM, resident in the service processor (step 616). The secure trusted dedicated microprocessor then provides a digitally signed quote response to the service processor (step 618).

Next, the service processor sends the quote response, along with the corresponding log data maintained by the OS kernel, to the verification and monitoring system (step 620). The verification and monitoring system already has, through the registration process described above and shown in step 504 of FIG. 5, the public key associated with the private key that the secure trusted dedicated microprocessor used to digitally sign the quote. Therefore, the verification and monitoring system authenticates that the secure trusted dedicated microprocessor's quote data is valid and that it originated from the service processor being monitored (step 622).

If the validation is not successful (step 624), then the service processor may have been compromised, and the verification and monitoring system performs one or more of the following actions or the like: log corresponding event(s); signal alert; notify designee; and initiate remediation, recovery, and/or termination of the service processor and/or the host processor. Examples of such actions are logging an error condition, alerting the host system operator, notifying the host system owner, (e.g., the organization or individual that has ownership of the physical host system) or other authorized personnel or system, initiating an update of the service processor or host system (remediation), initiating a re-install of the service processor's or host system's files (recovery), or shutting down the service processor and/or the host system (termination) (step 626). At that point, the state of the service processor is at best indeterminate, or at worst, insecure (step 634). The operation then terminates. If the validation is successful, additional analysis (step 628) may be performed on the quote data by comparing the quote data to whitelist data maintained by the verification and monitoring system and which was provided as part of the service processor software distribution. If the whitelist check passes (step 630), then the state of the service processor is considered to be secure (step 632). If the whitelist check does not pass, then the service processor may have been compromised, and execution then proceeds to step 626, after which the state of the service processor is at best indeterminate, or at worst, insecure (step 634). The operation then terminates. It should be appreciated that while FIG. 6 illustrates the operation terminating, this operation may be repeated for continuous monitoring until a next boot cycle occurs.

Thus, the illustrative embodiments provide mechanisms for securely booting a service processor, and monitoring service processor integrity. That is, the illustrative embodiments provide mechanisms for protecting service processors from executing and using corrupted firmware, software, or data by providing a combination of firmware, software, security hardware, and a remotely located and secure verification and monitoring system designed to protect such service processors.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A service processor, comprising:
a processor;
a memory coupled to the processor and comprising instructions for executing an operating system kernel having an integrity management subsystem;
secure boot firmware;
an event log storage; and
a tamper-resistant secure trusted dedicated microprocessor, wherein:
the service processor operates to manage a host computing system;
the secure boot firmware performs a secure boot operation to boot the operating system kernel of the service processor;
the secure boot firmware records first measurements of code executed by the secure boot firmware when performing the boot operation, in one or more registers of the tamper-resistant secure trusted dedicated microprocessor;
the operating system kernel enables the integrity management subsystem;
the integrity management subsystem records second measurements of software executed by the operating system kernel, in the one or more registers of the tamper-resistant secure trusted dedicated microprocessor;
the integrity management subsystem records third measurements of boot software executed in the host computing system, in the one or more registers;
the operating system kernel records one or more entries, in the event log storage, identifying one or more events causing at least one of the recording of the first measurements, the recording of the second measurements, or the recording of the third measurements, wherein at least one entry in the one or more entries identifies an event causing the recording of a third measurement associated with boot software executed in the host computing system; and
each entry of the one or more entries comprises an identifier of a corresponding register within the one or more registers where corresponding measurement information is stored for that entry, wherein the entries in the event log storage comprise a register identifier identifying a register where a corresponding measurement is stored, a file hash of an executable file that caused the corresponding measurement to be recorded, and a hint of the full path and filename of the executable file that caused the corresponding measurement to be recorded.

2. The service processor of claim 1, wherein the integrity management subsystem performs an appraisal operation on at least one of files or data accessed by the operating system kernel, or on the boot software executed in the host computing system associated with the service processor, wherein the appraisal operation verifies the files or data, or the boot software, based on a hash comparison or digital signature verification.

3. The service processor of claim 2, wherein the service processor operates in one of an enforcing mode or a logging mode, and wherein:
in response to results of performing the appraisal indicating a failure of the appraisal, and the service processor operating in the enforcing mode, the service processor transmits an alert notification indicating that the service processor has been compromised and terminates services of the service processor; and
in response to results of performing the appraisal indicating a failure of the appraisal, and the service processor operating in the logging mode, the service processor logs the appraisal failure in a log data structure and continues to provide services.

4. The service processor of claim 1, wherein the integrity management subsystem implements a predefined policy for recording the second measurements that specifies one or more labels that indicate files for which second measurements are to be generated, and wherein the recording of the second measurements is performed only with regard to files having an associated label specified in the policy as being a label for which recording of second measurements is to be performed.

5. The service processor of claim 4, wherein the files have an extended attribute specifying a label associated with the file, and wherein only files having an extended attribute specifying the label for which recording of second measurements is to be performed match the one or more labels of the predefined policy, and wherein the policy is stored in a digitally signed initial file system image verified and loaded at boot time of the service processor.

6. The service processor of claim 1, wherein the service processor is registered with a remotely located verification and monitoring computing system to generate service processor registration information, the service processor transmits the first measurements and second measurements to the remotely located verification and monitoring computing system, and wherein the remotely located verification and monitoring computing system performs verification of the recorded first measurements and second measurements based on the service processor registration information.

7. The service processor of claim 6, wherein the service processor registration information comprises at least one of an identification of the service processor or public keys stored in the service processor and associated with private keys of the service processor used to generate at least one of the first measurements or second measurements.

8. The service processor of claim 6, wherein a service processor provider system registers a whitelist data structure with the remotely located verification and monitoring system, wherein the whitelist data structure comprises a listing of applications or application components that are authorized for execution, and wherein the remotely located verification and monitoring computing system performs verification at least by verifying the recorded first measurements and second measurements based on contents of the whitelist data structure.

9. The service processor of claim 1, wherein the first measurements and second measurements are of software, code, or data that is immutable, and wherein measurements are not made by the service processor for mutable software or code executed by, or mutable data accessed by, the service processor or host computing system associated with the service processor.

10. A data processing system, comprising:
a service processor; and
a host computing system coupled to the service processor, wherein the service processor:
performs a secure boot operation, by secure boot firmware of the service processor, to boot an operating system kernel of the service processor;
records first measurements of code executed by the secure boot firmware when performing the boot operation, in one or more registers of a tamper-resistant secure trusted dedicated microprocessor of the service processor;

enables an integrity management subsystem of the booted operating system kernel;

records, by the enabled integrity management subsystem of the booted operating system kernel, second measurements of software executed by the operating system kernel, in the one or more registers of the tamper-resistant secure trusted dedicated microprocessor; and manages execution of code on the host computing system, wherein:

the integrity management subsystem records third measurements of boot software executed in the host computing system, in the one or more registers;

the operating system kernel records one or more entries, in an event log storage, identifying one or more events causing at least one of the recording of the first measurements, the recording of the second measurements, or the recording of the third measurements, wherein at least one entry in the one or more entries identifies an event causing the recording of a third measurement associated with boot software executed in the host computing system; and each entry of the one or more entries comprises an identifier of a corresponding register within the one or more registers where corresponding measurement information is stored for that entry, wherein the entries in the event log storage comprise a register identifier identifying a register where a corresponding measurement is stored, a file hash of an executable file that caused the corresponding measurement to be recorded, and a hint of the full path and filename of the executable file that caused the corresponding measurement to be recorded.

11. The data processing system of claim 10, wherein the integrity management subsystem performs an appraisal operation on at least one of files or data accessed by the operating system kernel, or on the boot software executed in the host computing system associated with the service processor, wherein the appraisal operation verifies the files or data, or the boot software, based on a hash comparison or digital signature verification.

12. The data processing system of claim 11, wherein the service processor operates in one of an enforcing mode or a logging mode, and wherein:

in response to results of performing the appraisal indicating a failure of the appraisal, and the service processor operating in the enforcing mode, the service processor transmits an alert notification indicating that the service processor has been compromised and terminates services of the service processor; and in response to results of performing the appraisal indicating a failure of the appraisal, and the service processor operating in the logging mode, the service processor logs the appraisal failure in a log data structure and continues to provide services.

13. The data processing system of claim 10, wherein the integrity management subsystem implements a predefined policy for recording the second measurements that specifies one or more labels that indicate files for which second measurements are to be generated, and wherein the recording of the second measurements is performed only with regard to files having an associated label specified in the policy as being a label for which recording of second measurements is to be performed.

14. The data processing system of claim 13, wherein the files have an extended attribute specifying a label associated with the file, and wherein only files having an extended attribute specifying the label for which recording of second measurements is to be performed match the one or more labels of the predefined policy, and wherein the policy is stored in a digitally signed initial file system image verified and loaded at boot time of the service processor.

15. The data processing system of claim 10, further comprising a verification and monitoring computing system coupled to the service processor via at least one data communication link, wherein the verification and monitoring computing system is remotely located from the service processor.

16. The data processing system of claim 15, wherein the service processor is registered with the verification and monitoring computing system to generate service processor registration information, the service processor transmits the first measurements and second measurements to the verification and monitoring computing system, and wherein the verification and monitoring computing system performs verification of the recorded first measurements and second measurements based on the service processor registration information.

17. The data processing system of claim 16, wherein the service processor registration information comprises at least one of an identification of the service processor or public keys stored in the service processor and associated with private keys of the service processor used to generate at least one of the first measurements or second measurements.

18. The data processing system of claim 16, further comprising:

a service processor provider system coupled to the verification and monitoring computing system, wherein the service processor provider system registers a whitelist data structure with the verification and monitoring system, wherein the whitelist data structure comprises a listing of applications or application components that are authorized for execution, and/or data to be accessed and wherein the remotely located verification and monitoring computing system performs verification at least by verifying the recorded first measurements and second measurements based on contents of the whitelist data structure.

19. The data processing system of claim 16, wherein performing verification comprises:

performing an authentication and authorization operation on at least one of an application executed by the service processor or data operated on by the service processor based on version information for the application or data; and performing a responsive action in response to the application or data not being authenticated or not being authorized based on results of performing the authentication and authorization operation, wherein the responsive action comprises at least one of logging an entry in an event log indicating results of performing the authentication and authorization operation, sending an alert notification indicating results of performing the authentication and authorization operation, initiating a remediation or recovery operation to restore the data processing system to a secure state, or disabling services of the service processor.

20. The data processing system of claim 19, wherein performing verification comprises:
- comparing the first measurements and the second measurements to a dynamic whitelist data structure comprising previous measurements collected from the service processor;
- determining whether there are differences between the previous measurements, in the dynamic whitelist data structure, and the first measurements and the second measurements; and
- in response to determining that there are differences between the previous measurements, in the dynamic whitelist data structure, and the first measurements and the second measurements, performing an authorization and authentication operation on the first measurements and second measurements to determine if the differences are authorized and authentic.

21. The data processing system of claim 20, wherein performing verification comprises:
- in response to determining that the differences are authorized and authentic, updating the dynamic whitelist data structure to include the first measurements and second measurements as a replacement of the previous measurements.

22. The data processing system of claim 10, wherein the first measurements and second measurements are of software, code, or data that is immutable, and wherein measurements are not made by the service processor for mutable software or code executed by, or mutable data accessed by, the service processor or host computing system.

* * * * *